US009623969B2

(12) United States Patent
Nelson

(10) Patent No.: US 9,623,969 B2
(45) Date of Patent: Apr. 18, 2017

(54) MULTICOPTER WITH DETACHABLE WING

(71) Applicant: Brian Dale Nelson, Birchwood, MN (US)

(72) Inventor: Brian Dale Nelson, Birchwood, MN (US)

(73) Assignee: Brian Dale Nelson, Birchwood, MN (US)

( * ) Notice: Subject to any disclaimer, the term of this patent is extended or adjusted under 35 U.S.C. 154(b) by 225 days.

(21) Appl. No.: 14/599,464

(22) Filed: Jan. 17, 2015

(65) Prior Publication Data

US 2016/0272316 A1    Sep. 22, 2016

(51) Int. Cl.
*B64C 27/22* (2006.01)
*B64C 39/02* (2006.01)

(52) U.S. Cl.
CPC ...... *B64C 39/024* (2013.01); *B64C 2201/027* (2013.01); *B64C 2201/042* (2013.01); *B64C 2201/104* (2013.01); *Y02T 50/62* (2013.01)

(58) Field of Classification Search
CPC ............ B64C 39/024; B64C 2201/042; B64C 2201/108; B64C 13/18; B64C 2201/146; B64C 2001/0072; B64C 2201/024; B64C 27/08; B64C 9/02; B64C 11/001; B64C 2027/002; B64C 25/001; B64C 25/10; B64C 25/14; B64C 9/10; B64C 11/00; B64C 11/20; B64C 13/12; B64C 13/503; B64C 1/061; B64C 1/064; B64C 1/24; B64C 2001/0054; B64C 2003/445; B64C 2201/102; B64C 2201/126; B64C 2201/141; B64C 2201/165; B64C 25/60; B64C 25/64; B64C 27/10; B64C 27/32; B64C 27/33; B64C 27/473; B64C 29/0025; B64C 37/00; B64C 39/02; B64C 3/185; B64C 3/32; B64C 3/48; B64C 5/12;

(Continued)

(56) References Cited

U.S. PATENT DOCUMENTS 5,810,284 A * 9/1998 Hibbs ............... B64C 39/10
                                              244/13
8,764,397 B1 * 7/2014 Wittig .............. B64C 27/16
                                              416/1

(Continued)

*Primary Examiner* — Medhat Badawi
*Assistant Examiner* — George Andonyan

(57) ABSTRACT

An unmanned aerial vehicle (UAV) that can operate both as a conventional multicopter with no wing attached, or, it can operate as a winged multicopter. The detachable wing design used in the invention provides versatility without compromising performance; the wing attachment receptacles add no weight to the wingless multicopter configuration because they also function as the leg receptacles. In one embodiment, the base multicopter configuration is a quad-copter with four propeller drives. Four tubular receptacles, two forward and two aft, provide attachment points for the vertical struts of a detachable rectangular shaped wing, these vertical struts also function as the legs of the multicopter. The wing is fabricated using lightweight struts and rip stop nylon fabric which can be easily folded into a compact shape using quick release pins. In another embodiment, the wing is fabricated using a foam core. In both embodiments, the angle of the detachable wing can be adjusted to optimize lift and drag in the forward thrust, tilted position of the multicopter.

5 Claims, 15 Drawing Sheets

(58) Field of Classification Search
CPC ..... B64C 7/00; B64C 9/323; B64C 2201/027; Y02T 50/145; Y02T 50/64
See application file for complete search history.

(56) References Cited

U.S. PATENT DOCUMENTS

| | | | | |
|---|---|---|---|---|
| 8,931,730 | B2* | 1/2015 | Wang | B64C 39/028 244/100 R |
| 9,272,784 | B2* | 3/2016 | Nelson | B64C 27/26 |
| 2010/0140415 | A1* | 6/2010 | Goossen | B64C 27/20 244/23 A |
| 2014/0061376 | A1* | 3/2014 | Fisher | B64D 27/24 244/62 |
| 2014/0339355 | A1* | 11/2014 | Olm | B64C 27/08 244/17.23 |
| 2014/0374532 | A1* | 12/2014 | Duffy | B64C 37/02 244/2 |
| 2015/0232181 | A1* | 8/2015 | Oakley | B64C 39/024 701/2 |
| 2015/0245516 | A1* | 8/2015 | Christensen | A63H 17/28 362/470 |
| 2015/0259066 | A1* | 9/2015 | Johannesson | B64C 27/08 244/17.27 |
| 2015/0329204 | A1* | 11/2015 | Nelson | B64C 39/024 244/6 |
| 2016/0129998 | A1* | 5/2016 | Welsh | B64C 39/024 244/12.3 |
| 2016/0137298 | A1* | 5/2016 | Youngblood | B64C 39/024 244/17.23 |
| 2016/0144957 | A1* | 5/2016 | Claridge | B64C 29/02 244/6 |
| 2016/0229534 | A1* | 8/2016 | Hutson | B64C 27/08 |

* cited by examiner

MULTICOPTER WITH DETACHABLE WING

Embodiments of the invention relate generally to Unmanned Aerial Vehicles (UAVs), personal drones, and, more particularly to multicopters with various configurations of rotary propeller drives and wing combinations thereof.

BACKGROUND

An Unmanned Aerial Vehicle (UAV), commonly referred to as a drone, is an aircraft without a human pilot. It is controlled either by remote control using a radio signal, or, autonomously using an onboard computer system. UAVs are commonly used in military operations where missions are often too hazardous to deploy manned aircraft.

The use of personal drones has become increasingly popular over the last few years. Manufacturers have developed a wide variety of multicopters with three or more rotary propellers that are used for lift and propulsion, with the most popular version being a four rotor quadcopter. Advances in microelectromechancial system (MEMS) gyroscopes and accelerometers have allowed onboard computers to autonomously sense and control the pitch, roll, and yaw of these rotary multicopters. Some advanced personal drones are also equipped with global positioning systems (GPS) and compass microcircuits that allow an onboard computer to fly the multicopter autonomously between preprogrammed waypoints. These systems also allow the multicopters to return safely to a home position given a low battery or lost telemetry signal situation. Multicopters are often equipped with a camera system for aerial photography. The main advantage of a multicopter its flight maneuverability including vertical takeoffs, landings, and the ability to hover in a fixed position. The main limitation of a multicopter is its limited flight time due to battery charge limitations. The typical flight time for a personal multicopter drone is 5-15 minutes.

Another common type of personal drone is a rotary propeller powered fixed wing plane. Fixed wing planes typically cost more than multicopters because they require servos and linkages to actuate flight control surfaces such as ailerons, a rudder, and an elevator. Fixed wing drones can be equipped with all of the sensors and onboard computers used by multicopters for autonomous flight. The main advantage of fixed wing planes is their longer flight time, typically 30-60 minutes on a battery charge. Flight time is extended because the wings provide lift. The main disadvantage of fixed wing planes is their limited flight maneuverability. Because they require a forward thrust to provide lift, they cannot perform vertical takeoffs and landings, and they cannot hover in a fixed position in space.

There are personal drones that integrate a multicopter platform with a fixed wing aircraft design. These personal drones typically use four propeller drives oriented in the vertical position for vertical takeoff capability. In some of these designs, once at cruising attitude, motorized mechanisms rotate the propeller drives towards the horizontal position and the aircraft functions as a fixed wing plane. In other designs, the multicopter resembles a large wing and the wing translates from a generally vertical orientation to a horizontal direction. The wings of these drones are integral to the frame of the aircraft and are therefore not detachable. These drones are often quite large because of their fixed wingspans, making them difficult to store and transport.

SUMMARY

The embodiments of the invention provide the vertical takeoff and landing (VTOL), and hovering capability of multicopters, with the extended flight times and maneuverability of fixed wing aircraft. The invention can operate both as a conventional multicopter with no wing attached, or, it can operate as a winged multicopter. The detachable wing design used in the invention provides versatility without compromising performance; the wing attachment receptacles add no weight to the wingless multicopter configuration because they also function as the leg receptacles. The vertical spars of the attached wing also function as the legs of the multicopter.

While operating as a multicopter without a wing, the invention weighs less and can more easily carry a camera payload for aerial photography. When operating with a wing, the invention could be used in longer, more acrobatic fights since a winged multicopter can dive and soar on wind currents. On windy days, a user may choose to fly without the wing to better control the flight of the invention.

The added cost and complexity of a conventional fixed wing plane design using servos and linkages to control flight control surfaces is not required because pitch, roll, yaw and forward thrust are all enabled using the multiple vertically mounted propeller drives by the same means as a conventional multicopter. The invention, along with conventional multicopters, move forward by tilting the aircraft frame and the subsequent propeller thrust vector (e.g., 1-90 degrees from horizontal), towards the direction of forward motion. The invention angles the wing control surface from horizontal so that it provides lift and minimal drag in this tilted forward thrust position. To add additional versatility in minimizing wing drag and optimizing flight performance, the invention provides adjustability to the wing attack angle (angle from horizontal).

In one embodiment of this invention, the wing is comprised of a lightweight rigid frame (e.g. carbon, aluminum, or fiberglass tubing or rods) that supports a sheet sail (e.g. ripstop nylon fabric) such as those found in many kite designs. By using a deformable sheet sail, this embodiment allows the wing to be rolled up into a small footprint for easy transport and storage. In another embodiment of this invention, the wing is constructed from a foam core, and is not foldable.

The above summary is not intended to describe each embodiment or every implementation of the invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The invention will be further described with reference to the figures of the drawing, wherein.

Figure 1:
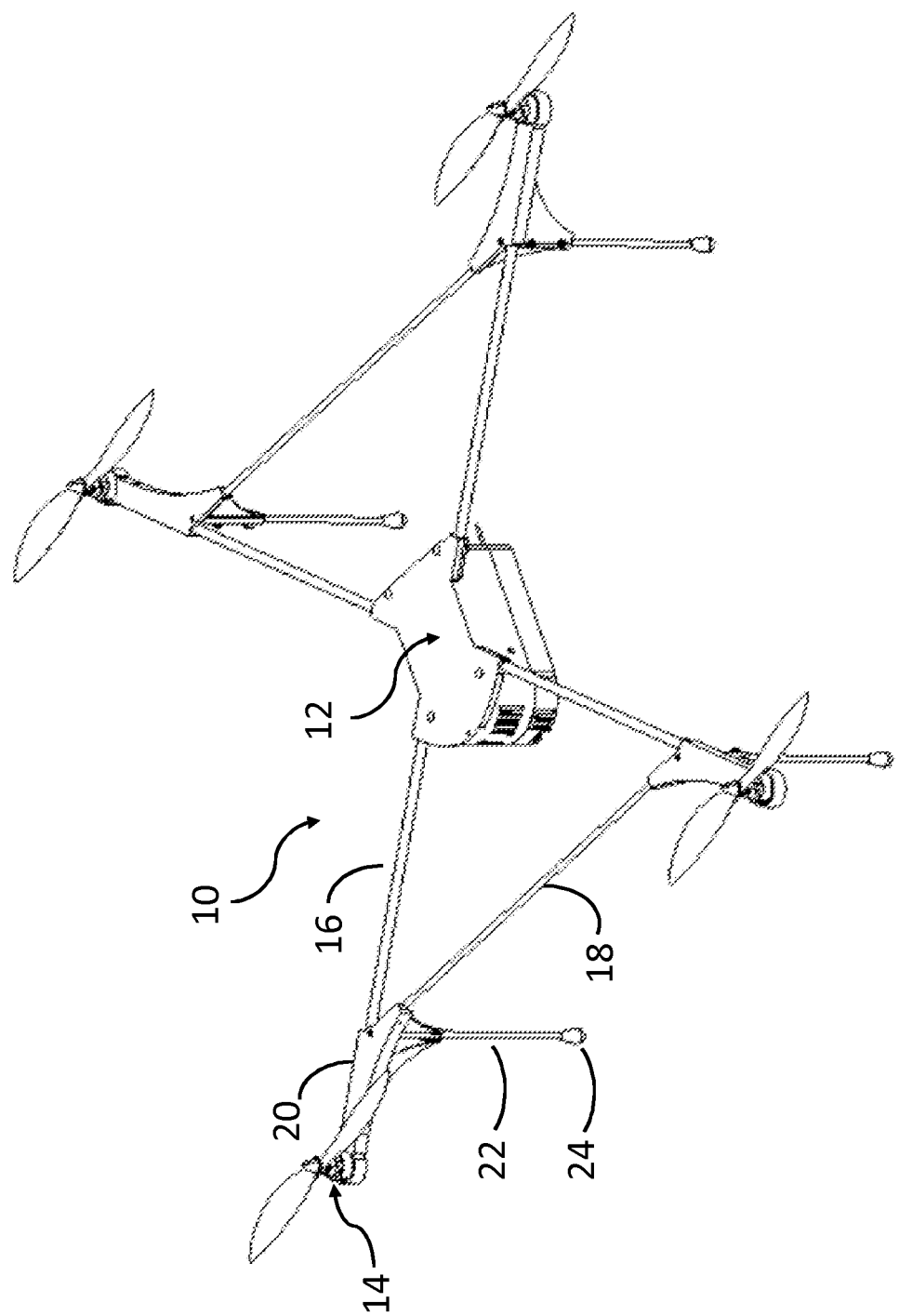
FIG. 1 is a front isometric view of the invention with no wing attached.

The figures are rendered primarily for clarity and are not necessarily drawn to scale. Moreover, various structure/components, including but not limited to fasteners, electrical components (wiring, cables, etc.), and the like, may be removed from some or all of the views where inclusion of such structure/components is not necessary to understand the various exemplary embodiments of the invention.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced.

Embodiments of the invention are directed generally to Unmanned Aerial Vehicles (UAVs) also referred to herein as "personal drones". While the embodiments of this invention use a rectangular wing configuration, other wing shapes may be used without departing from the scope of the invention. While the multicopter depicted in these embodiments uses four propeller drives, other quantities of propeller drives (e.g. 3-8 propeller drives) may be used without departing from the scope of the invention. The placement and quantity of the propeller drives can vary; typically the number of propeller drives is an even number so that the propellers can spin in opposing directions to cancel out any resultant torsional forces on the vehicle. Additional propeller drives typically provide additional lift to enable heavier payloads to be carried.

It is understood that individual parts may be assembled by several different means including, but not limited to, screws, bolts, adhesives, pins, retaining rings, press fits etc. without departing from the scope of the invention.

For simplicity, the wiring between electrical components and the motor drives has been eliminated. It is understood that all of the electrical components are connected by some form of wiring.

FIG. 1 is a front isometric view of the invention with no wing attached 10. In this embodiment, the invention operates as a conventional multicopter and may use four propeller drives assemblies 14. The four propeller drives assemblies 14 may be mounted to four motor mounts 20 using two screws to secure each motor (not shown). The motor mounts 20 may be comprised of injection molded plastic, 3D printed plastic, or made of a lightweight machined or cast material such as aluminum or titanium.

The electronics assembly 12 may be attached to each of the four motor mounts 20, using four frame spars 16 that extend outward from the electronics assembly 12. These frame spars 16 may be the same length, and be arranged at 45 degree angles in order to position the four propeller drives 14 in a symmetric pattern in order to balance the loads during flight. The electronics assembly 12 is the heaviest component in the multicopter 10 and therefore is centered between the four propeller drives 14 in order to balance weight and the loads to each drive. The frame spars 16 may consist of lightweight carbon fiber tubing (e.g. 0.375" diameter pultruded carbon tubes distributed by Goodwinds Inc.). The frame spars 16 may also allow the motor wires (not shown) to pass through the frame spars 16 in order to protect them from damage or snagging.

Two motor spars 18 may be used to stiffen, especially in torsion, the motor mounts 20 by joining each of the two pairs together. The multicopter 10 may rest on the ground using four legs 22. The four legs may form a square with equidistance between the legs in order to maximize symmetry and weight balance. The distance between legs may be in the range of 12 to 24 inches. The ends of the legs may be protected using a boot 24. This boot may be an elastomer (e.g. urethane, silicone) and may be attached using a friction fit for easy removal. Both the legs 22 and the motor spars 18 may be comprised of a smaller diameter, lightweight carbon fiber tubing (e.g. 0.240" diameter pultruded carbon tubes distributed by Goodwinds Inc.).

Figure 2:
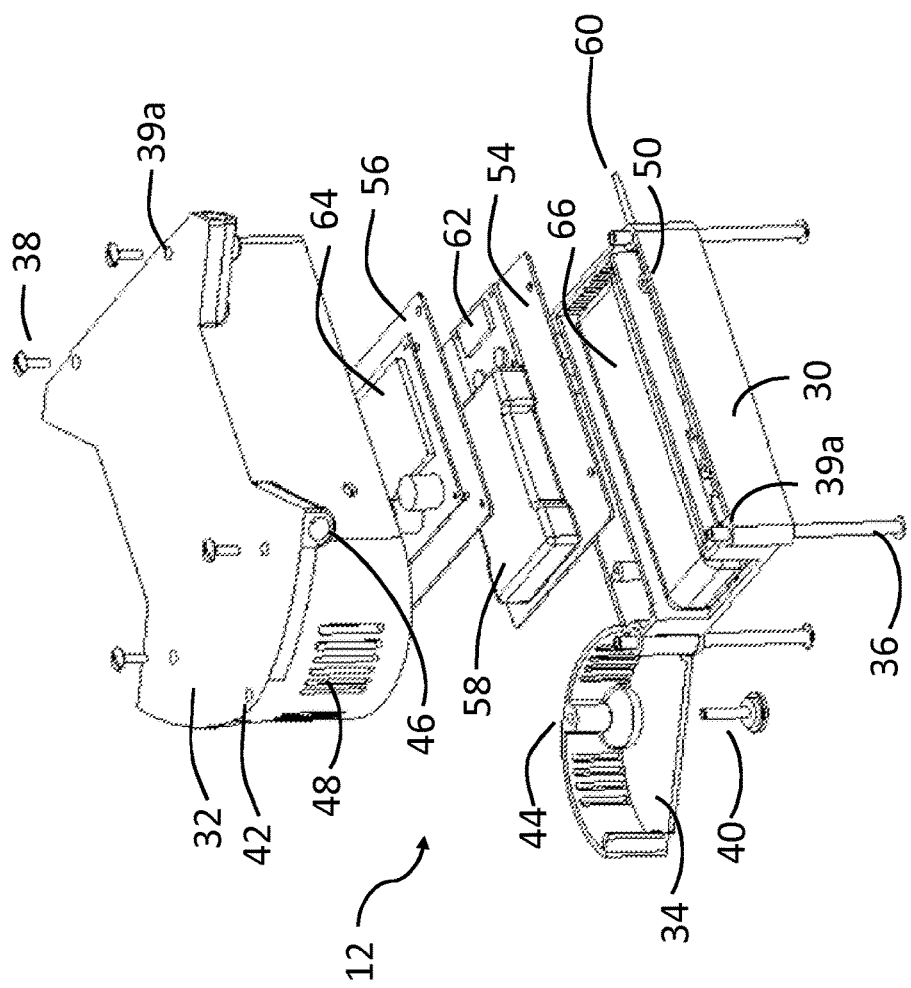
FIG. 2 is an exploded front isometric view of the electronics assembly.

FIG. 2 is a exploded front isometric view of the electronics assembly 12. The lower housing 30, upper housing 32 and the door 34 may be comprised of injection molded parts, but could also be 3D printed parts or machined or cast in a lightweight material such as aluminum or titanium. The electrical components may be mounted to a lower plate 54 and an upper plate 56 which may be die cut or laser cut out of a lightweight metallic sheet such as aluminum or titanium. The upper plate 56 may secure a power distribution board 64 used to control and distribute the high currents sent to the propeller drives 14 (e.g., Power Distribution Board distributed by 3D Robotics). This board may be mounted using standoffs and small screws and nuts (not shown). Additional cables and wiring (not shown) connect all of the electrical components within the electronics assembly 12.

The lower housing 30 may house the battery 66 (e.g., Lipro Power Pack 3s/11.1V 3500 mAh). Since the battery is frequently inserted and removed between charges, an door 34 may be opened and closed using one of four threaded posts 36 as a hinge. These threaded posts 36 and threaded post screws 38 may be used to assemble the door 34, the upper housing 32, and the lower housing 30. The door 34 may remain closed using a threaded thumb screw 40 that screws into a threaded door boss 42 that is part of the upper housing 32. The threads of this boss 42 (also shown in FIG. 3) may be either cut directly, or by using a heat staked or adhesively bonded threaded insert (not show). The lower housing 30 may also house a radio controlled receiver 60 that contains an antenna. The radio controlled receiver 60 may be used to send control commands and flight status information back to a base station receiver (e.g., 915 MHz 3DR RC Receiver distributed by 3D Robotics).

The lower plate 54 may be used to fixate an autopilot processing unit 58 (e.g., Pixhawk PX4 Autopilot distributed by 3D Robotics). The autopilot unit 58 may be attached to the lower plate 54 using double backed very high bond (VHB) acrylic foam tape, or using screws (not shown). The lower plate 54 may also house the global positioning module 62 (e.g., 3DR uBlox GPS module distributed by 3D Robotics) and may be mounted using standoffs and small screws and nuts (not shown). The lower plate 54 may be attached to the lower housing 30 using screws (not shown) that thread into lower plate threaded bosses 50.

In order to help cool the electrical components, air vents 48 may be formed into the door 34, upper housing 32 and the lower housing 30. In order to evenly distribute the weight of the heavier electrical components (e.g. battery, power board, GPS, autopilot), they may be stacked on top of each other such that the center of mass of each component passes through the plane of symmetry of the electronics assembly 12. Maintaining symmetry for all of the components in the invention ensures a balanced weight distribution during flight.

Figure 3:
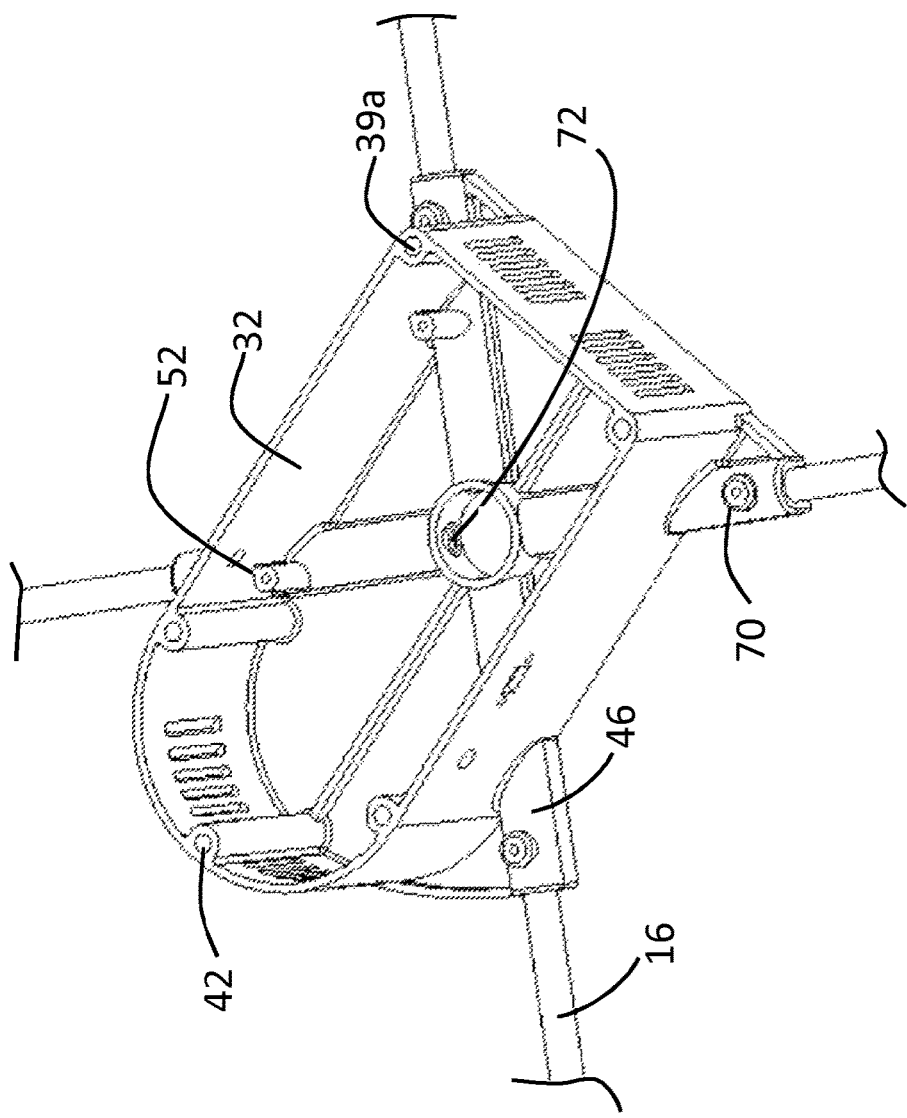
FIG. 3 is an enlarged isometric view of the upper housing and the assembled frame spars.

FIG. 3 is an enlarged isometric view of the upper housing 32 and the assembled frame spars 16. The four frame spars 16 may be fixated to the upper housing 32 by inserting them into four tubular frame spar receptacles 46. The four frame spars 16 may be further fixated by the use of set screws (not shown) threaded into set screw bosses 70. Propeller drive 14 wires (not shown) may be routed through the frame spars 16 from the electronics assembly 12 through holes 72 in the upper housing 32. The upper plate 56 may be attached to the upper housing 32 using screws (not shown) that thread into upper plate threaded bosses 52.

Figure 4:
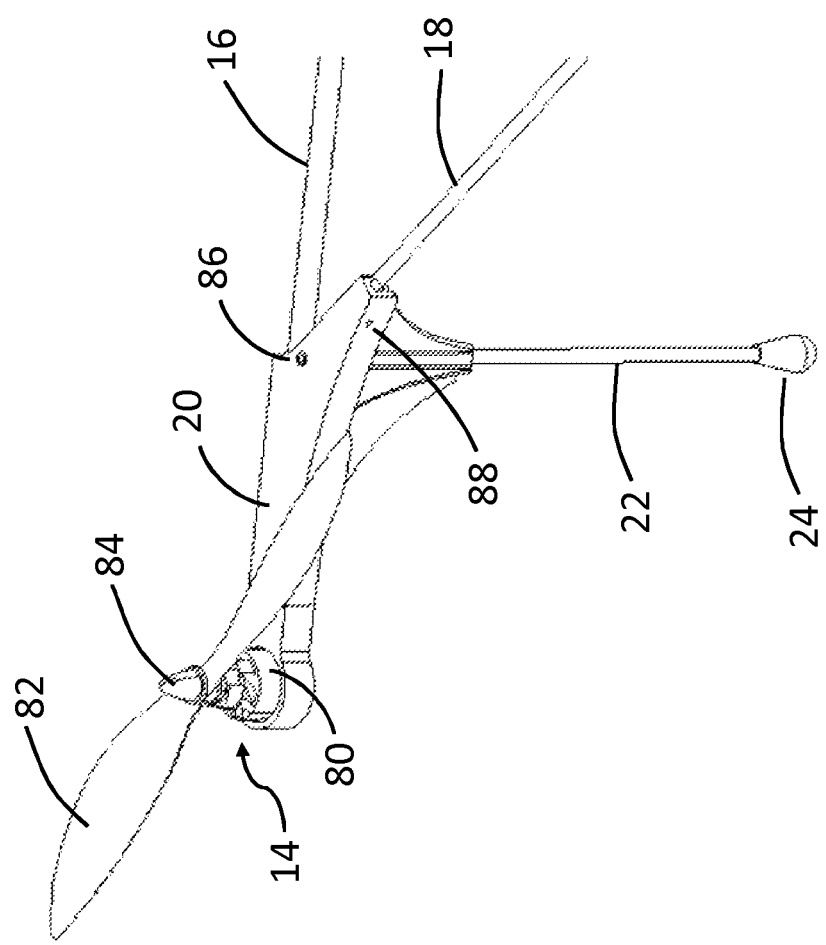
FIG. 4 is a front isometric view of the motor mount assembly.
Figure 5:
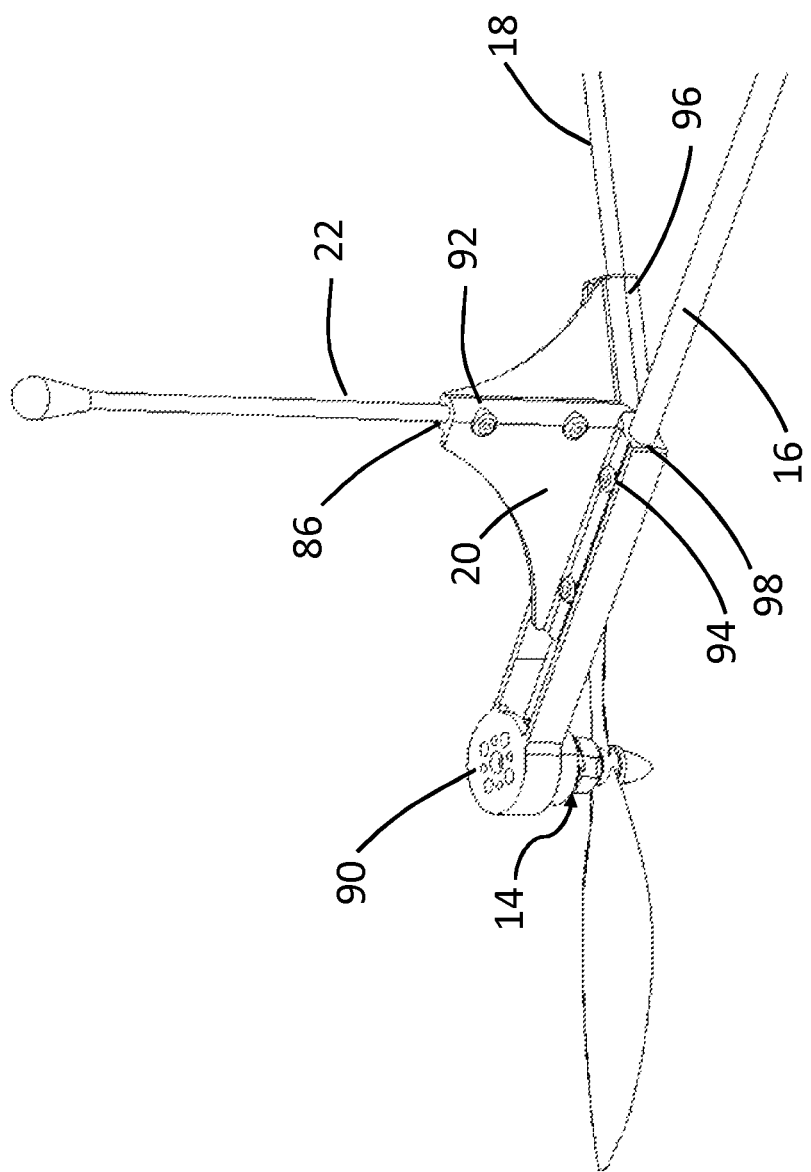
FIG. 5 is a bottom isometric view of the motor mount assembly.

FIG. 4 is a front isometric view of the motor mount 20 assembly, and FIG. 5 is a bottom isometric view of the motor mount 20 assembly. The propeller drives 14 may consist of the motor 80 (e.g. 850Kv AC2830-358 sold by 3D Robotics Inc.), a propeller 82 (e.g. APC 11x47 Push Pull Set sold by 3D Robotics Inc.), and propeller mounting hardware 84 (e.g. Propeller fastener kit sold by 3D Robotics Inc.). Propeller drive 14 may be rigidly attached to the motor mount 20 using screws (not shown) through access holes 90. Two of the four propeller drives 14 spin in opposite directions in order to cancel out any net torsional forces, and the propellers are mounted as a means to provide thrust in the same direction with their axes aligned in the same upward vertical direction.

The motor mount 20 may be attached to frame spar 16 by inserting it into a frame spar receptacle 98 and further securing it using set screws (not shown) threaded into set screw bosses 94. This frame spar receptacle 98 may be a thru hole formed into the motor mount 20 allowing wires to pass between the electronics assembly 12 and the propeller drives 14. The motor mount 20 may be further stiffened (especially in torsion) by attaching a motor spar 18 that attaches a pair of motor mounts 20. The motor spar may be fixated by inserting into a motor spar receptacle 96 and further securing it using a set screw (not shown) threaded into a set screw hole 88. The leg 22 may be attached to the motor mount 20 using a vertical spar receptacle 86, which may be a thru hole formed into the motor mount 20. The leg 22 may be further secured using one or more set screws (not shown) threaded into a set screw holes 92.

Figure 6:
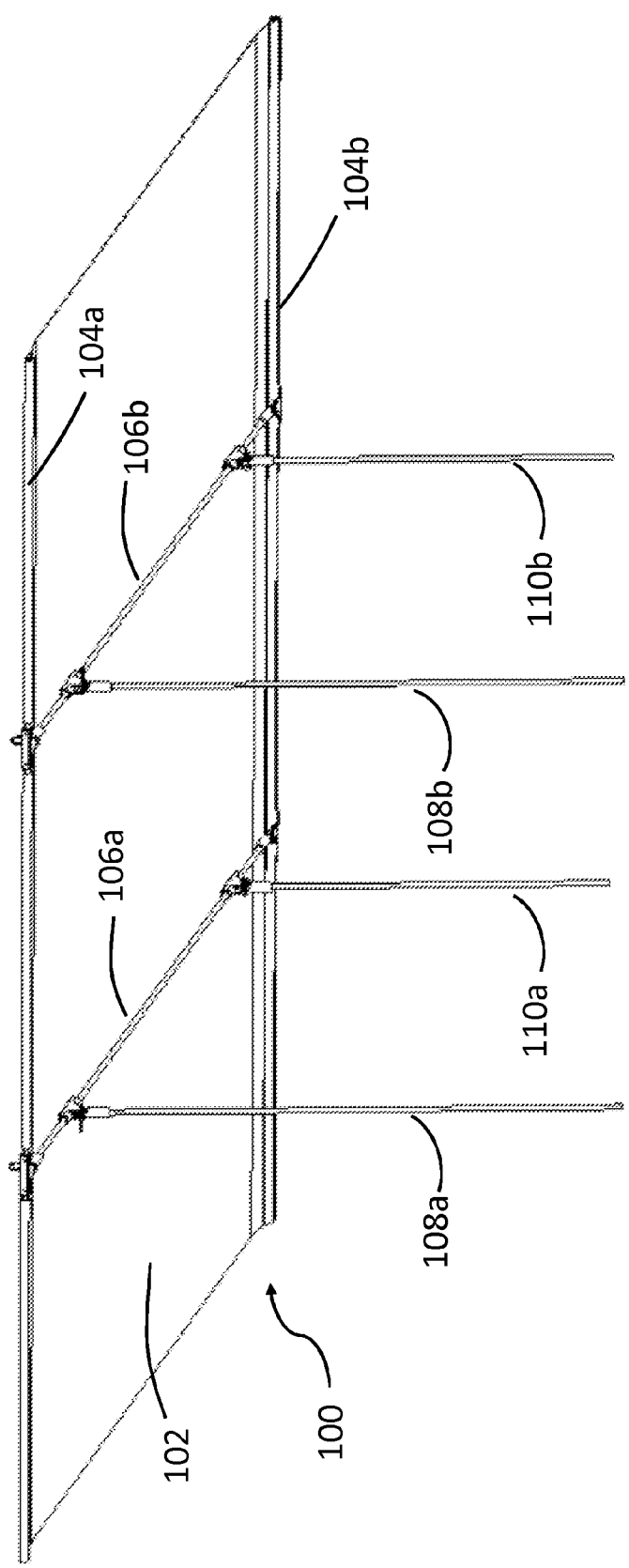
FIG. 6 is a front isometric view of the detachable sheet sail wing assembly.
Figure 7:
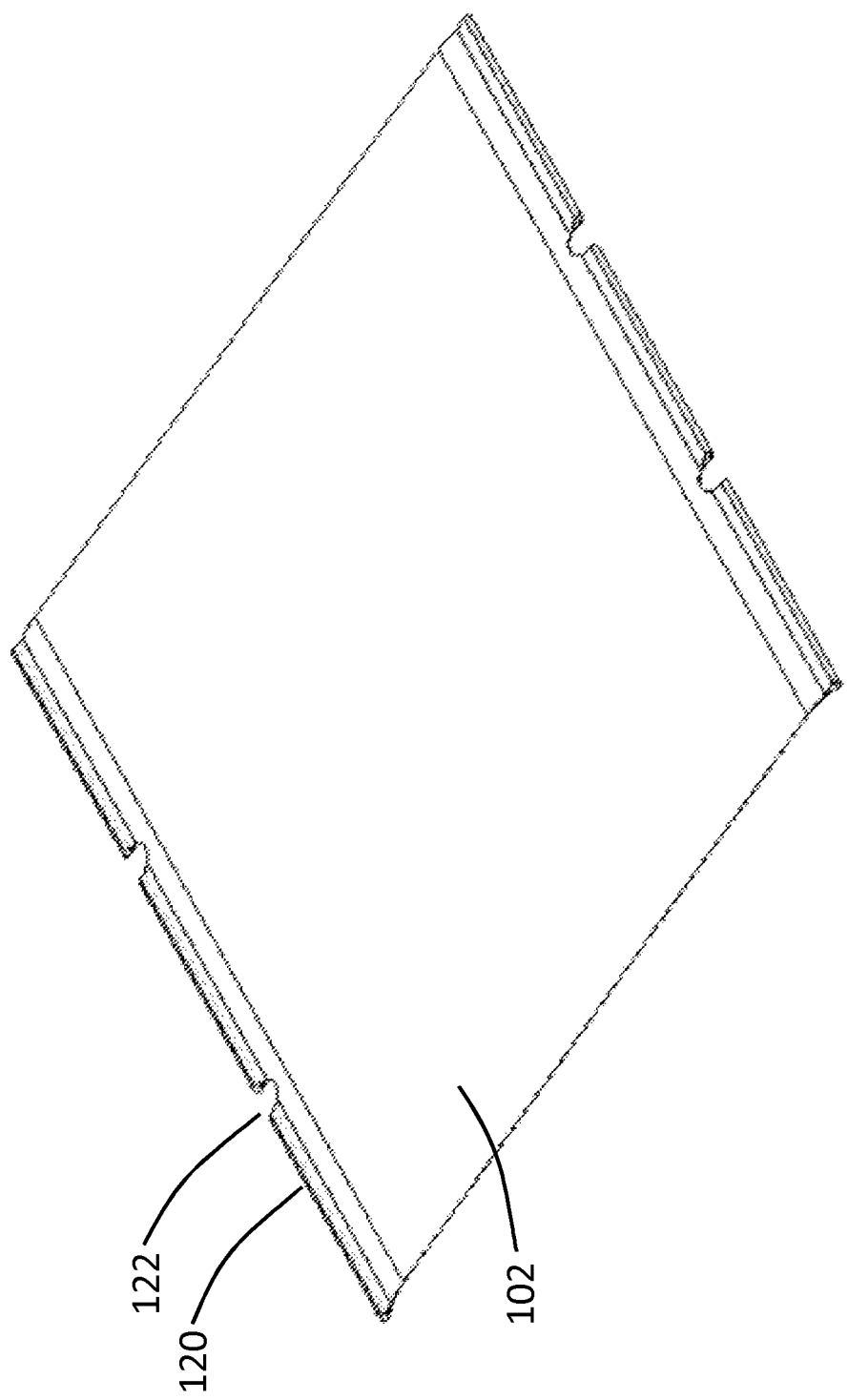
FIG. 7 is a front isometric view of the sheet sail.

FIG. 6 is a front isometric view of the detachable sheet sail wing assembly 100. The sheet sail wing assembly may be comprised of a sheet sail 102, two lateral spars 104a and 104b, two spine spars 106a and 106b, two front vertical spars 108a and 108b, and two rear vertical spars 110a and 110b. The spars may be comprised of lightweight carbon fiber tubing (e.g. 0.240" diameter pultruded carbon tubes distributed by Goodwinds Inc.). The sheet sail 102 may be comprised of a common kite material (e.g. ripstop nylon fabric). FIG. 7 is a front isometric view of the sheet sail. The lateral spars 104a and 104b, may be secured using seams 120 sewn into the sheet sail 102. Cutouts 122 may be cut into the sheet sail 102 to provide clearance for spar connectors.

Figure 8:
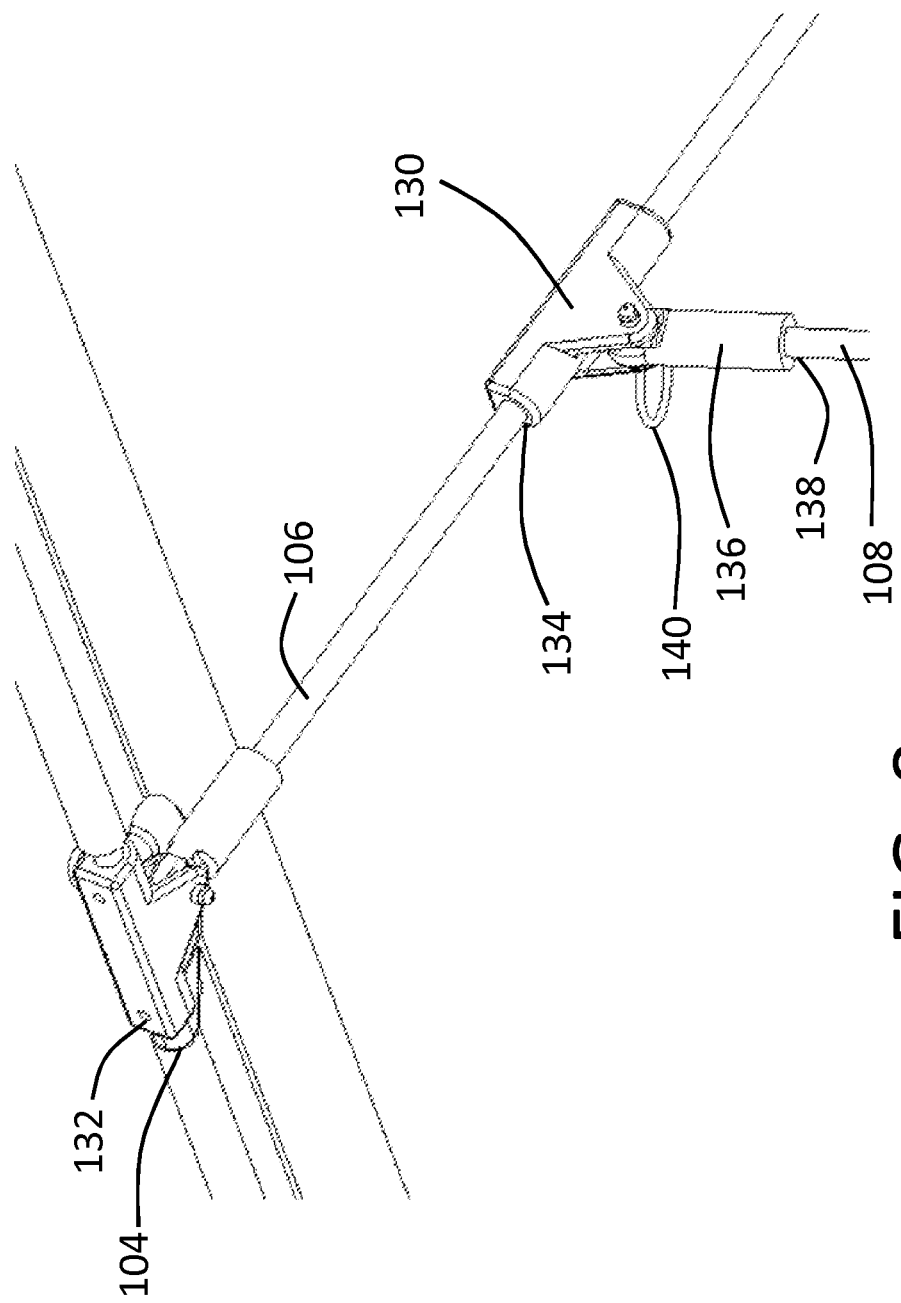
FIG. 8 is an enlarged isometric view of the wing spars and connectors.
Figure 9:
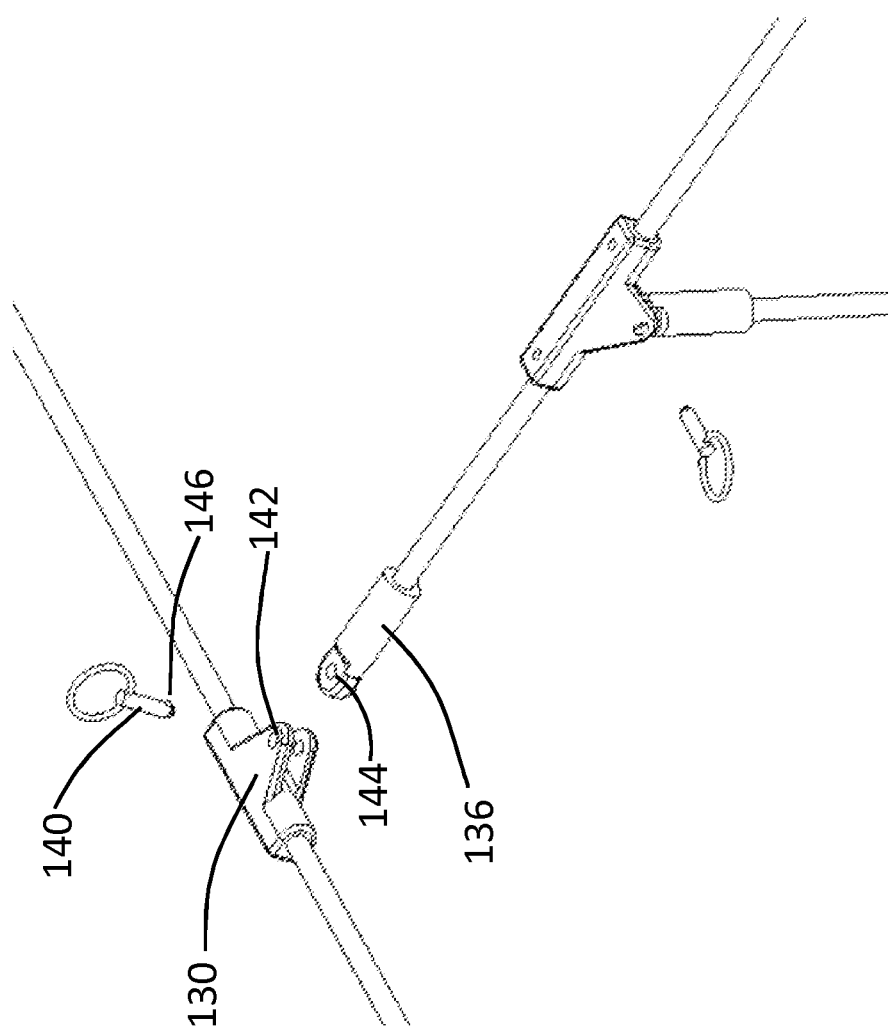
FIG. 9 is an enlarged isometric view of the wing spars and connectors in their detached positions.

FIG. 8 is an enlarged isometric view of the wing spars and connectors. Two spars may be joined together using a spar connector 130 and a pivot connector 136. The spar connector 130 may be fixated to the spars using a thru hole 134 and threaded holes 132 for set screws (not shown). The pivot connectors 136 may be attached to the end of a spar by inserting it into a blind hole 138 and using adhesive to secure the connector. The two connectors may then be joined together using a quick release pin 140. The quick release pin 140 allows the spars to be quickly disassembled (as shown n FIG. 9) to enable the wing to be folded into a compact shape (e.g. rolled into a tight cylindrical shape) for easy transport and storage. The quick release pin 140 may use a spring loaded ball 146 to secure the pin in holes 142 and 144 in the connectors.

Figure 10:
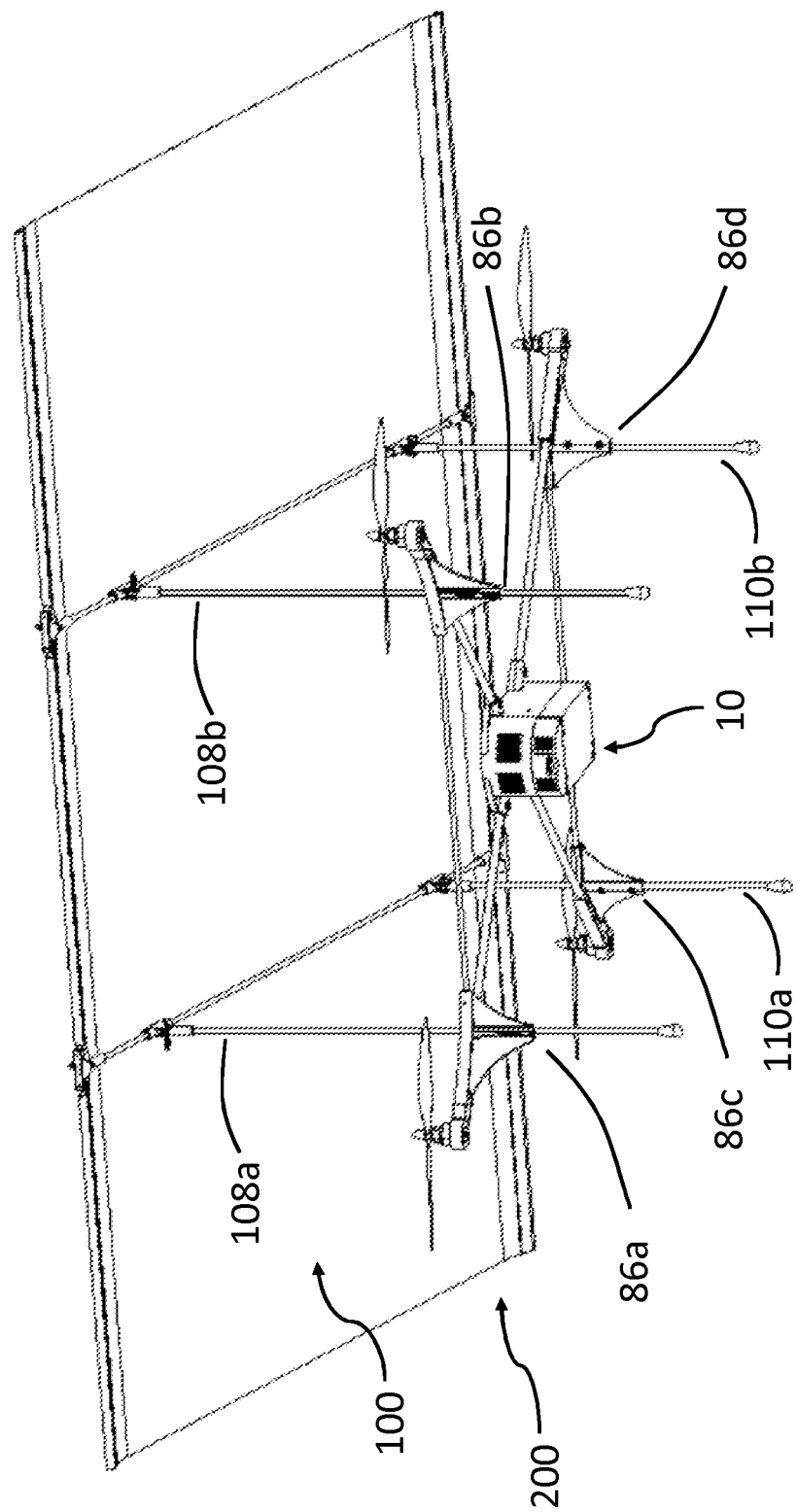
FIG. 10 is a front isometric view of the invention with the sheet sail wing assembly attached.

FIG. 10 is a front isometric view of the multicopter 10 with the sheet sail wing assembly 200 attached. The vertical spar receptacles 86a, 86b, 86c, and 86d in the motor mounts 20 serve a dual purpose whereby the legs 22 may be removed so that the vertical spars of a wing assembly 108a, 108b, 110a, and 110b may then be inserted into the vertical spar receptacles so that the vertical spars may act to secure the wing and act as the legs of the multicopter. This dual purpose ensures the multicopter contains no added features with added weight to secure a detachable wing.

Figure 11:
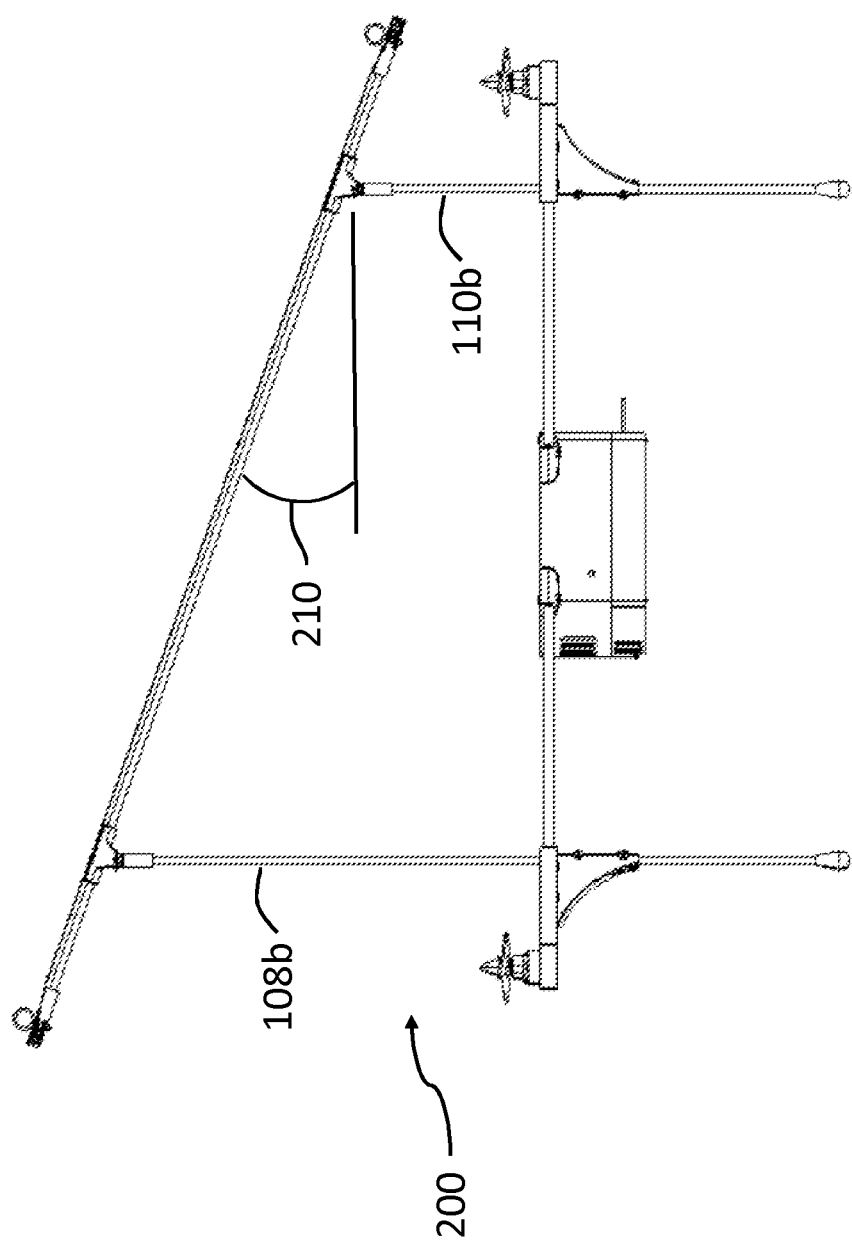
FIG. 11 is a front view of the invention with the sheet sail wing assembly attached.
Figure 12:
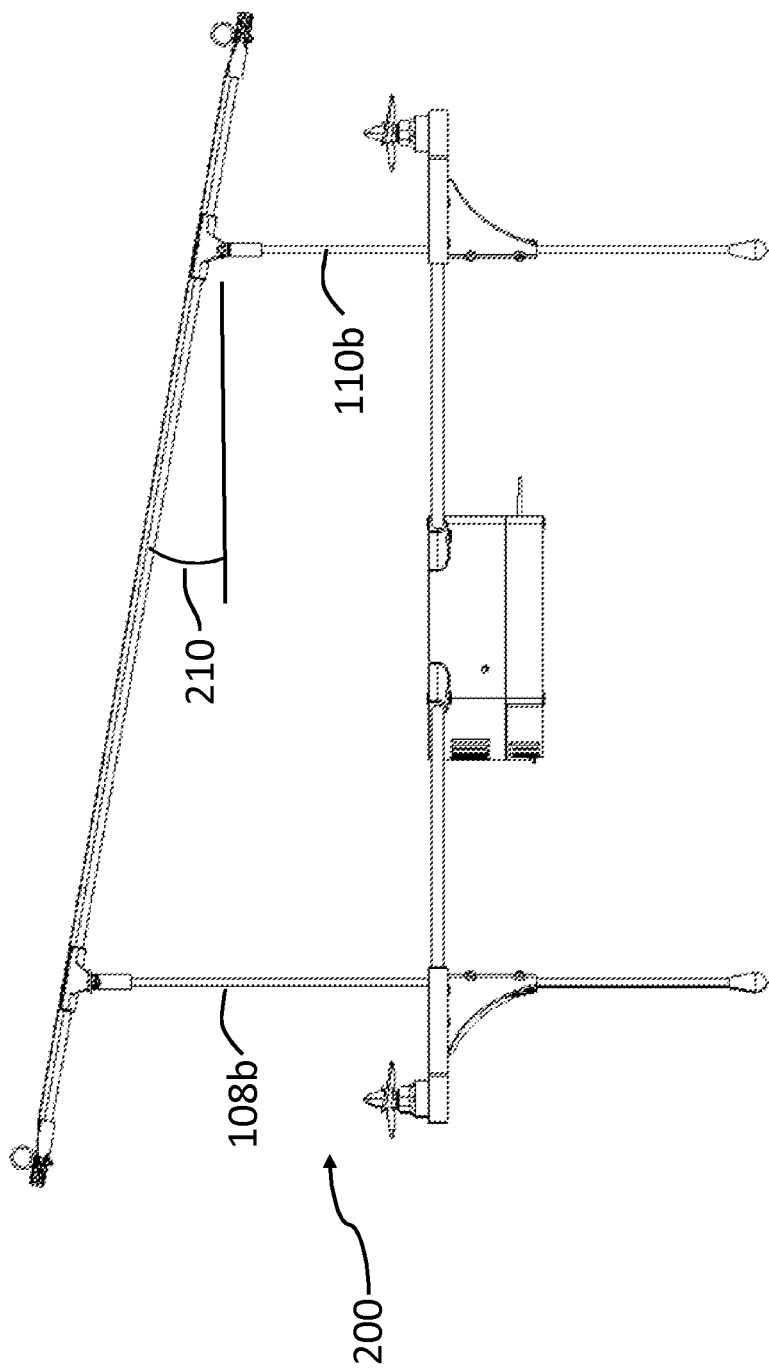
FIG. 12 is a front view of the invention with the sheet sail wing assembly attached with a lower wing angle from horizontal.
Figure 13:
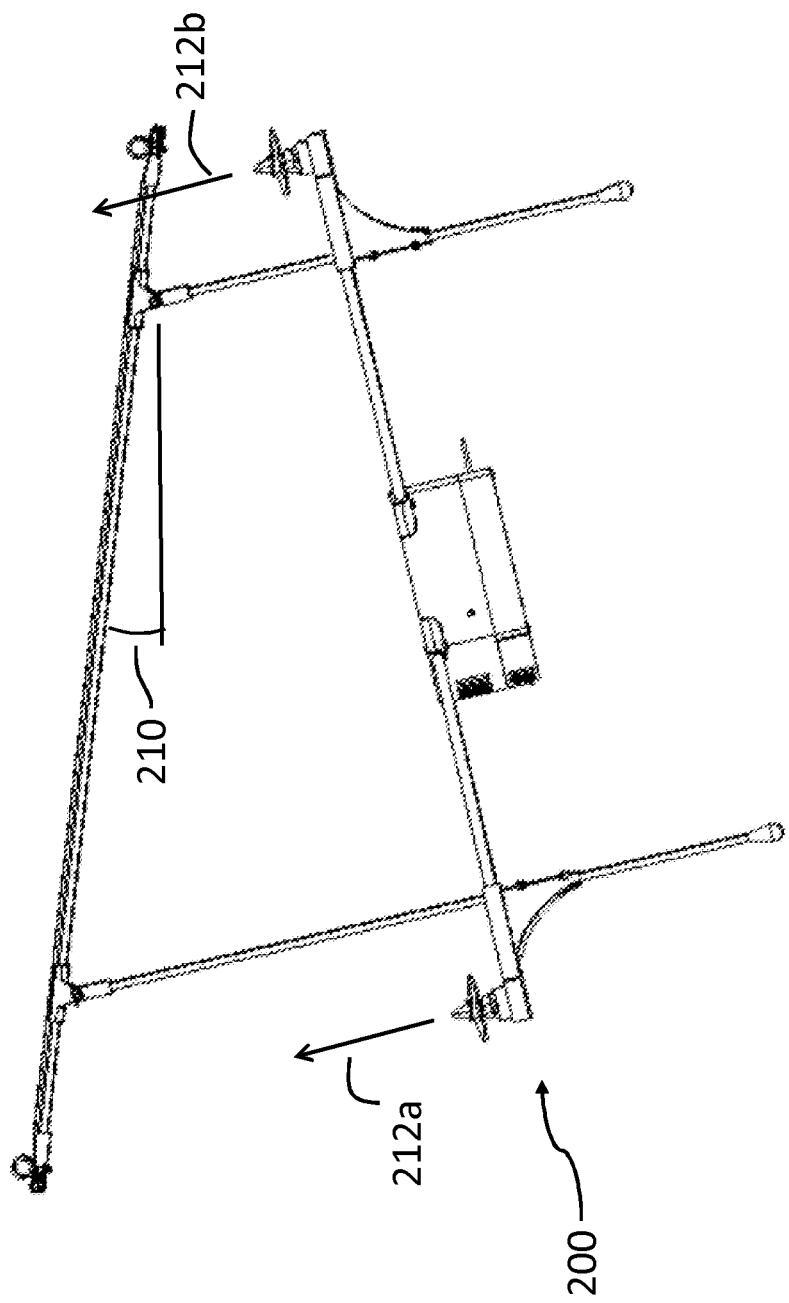
FIG. 13 is a front view of the invention with the sheet sail wing assembly attached in the forward thrust position.

FIG. 11 and FIG. 12 are front views of the multicopter with the sheet sail wing assembly attached 200, each view shows the wing angle from horizontal 210 in two different positions. FIG. 13 is a front view of the multicopter with the sheet sail wing assembly attached 200 in the forward thrust position with the propeller thrust vector 212a and 212b tilted forward towards the direction of motion. When a winged multicopter 200 moves forward, it tilts its frame forward which decreases the wing angle from horizontal 210 as shown in FIG. 13. There exists an optimal wing angle from horizontal 210 that provides lift with minimal drag for a given forward speed (and resulting tilt angle). The winged multicopter 200 allows this angle to be adjusted (see FIG. 11 and FIG. 12) by changing the length of the front vertical spars 108a and 108b. Changing the lengths of these spars changes the wing angle with horizontal 210. The spar connectors 130 (see FIG. 8) positions must also be adjusted slightly along the axial spars 106 by loosening and retightening the set screws 132 at the new angle 210 position. The simplest way to adjust the lengths of the front vertical spars 108a and 108b is to carry sets of these spars at various lengths for quick changouts using the quick release pins 140. Providing adjustability in the wing angle from horizontal 210 allows added versatility in optimizing wing angles for various cruising speeds.

Figure 14:
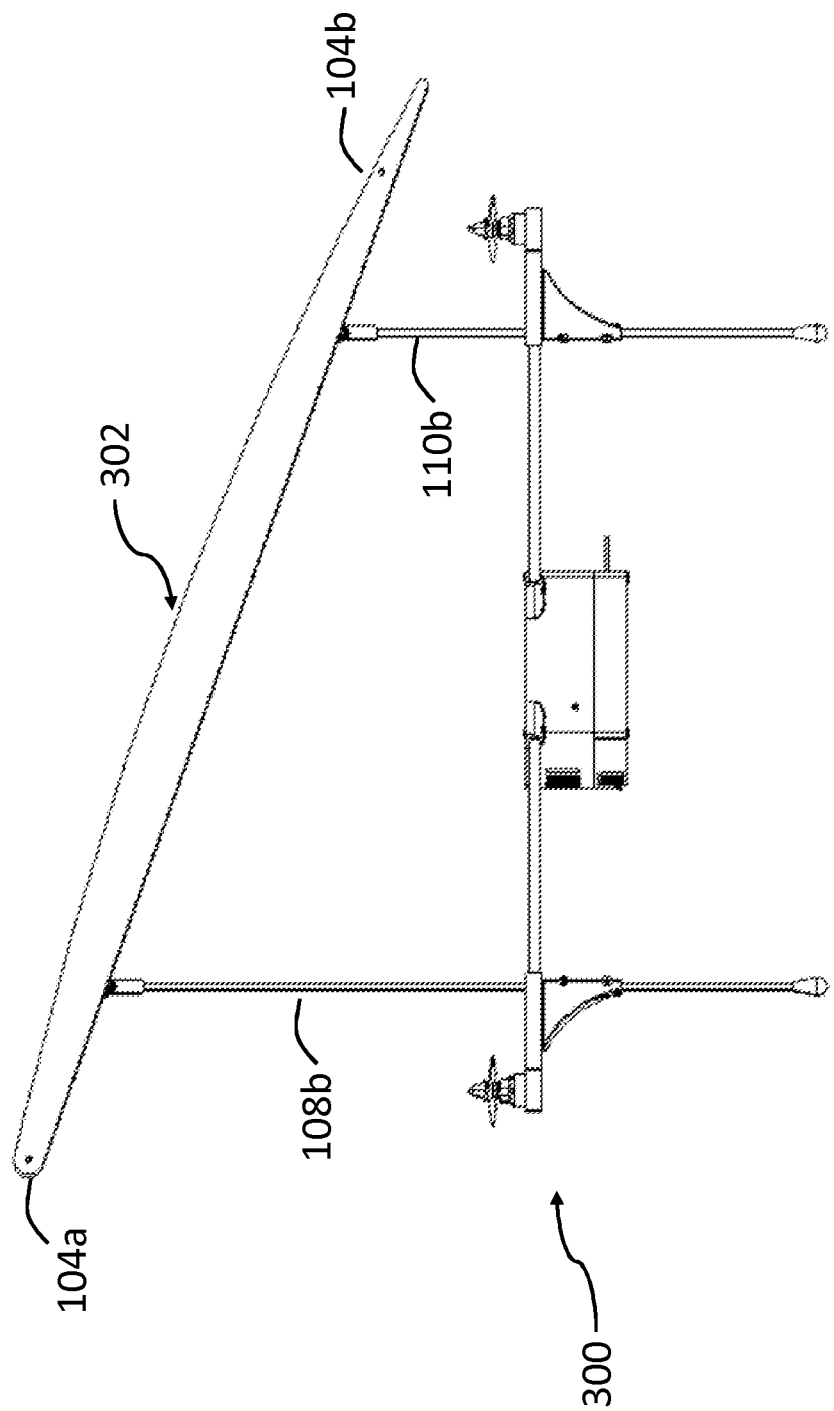
FIG. 14 is a front view of the invention with the foam wing assembly attached.
Figure 15:
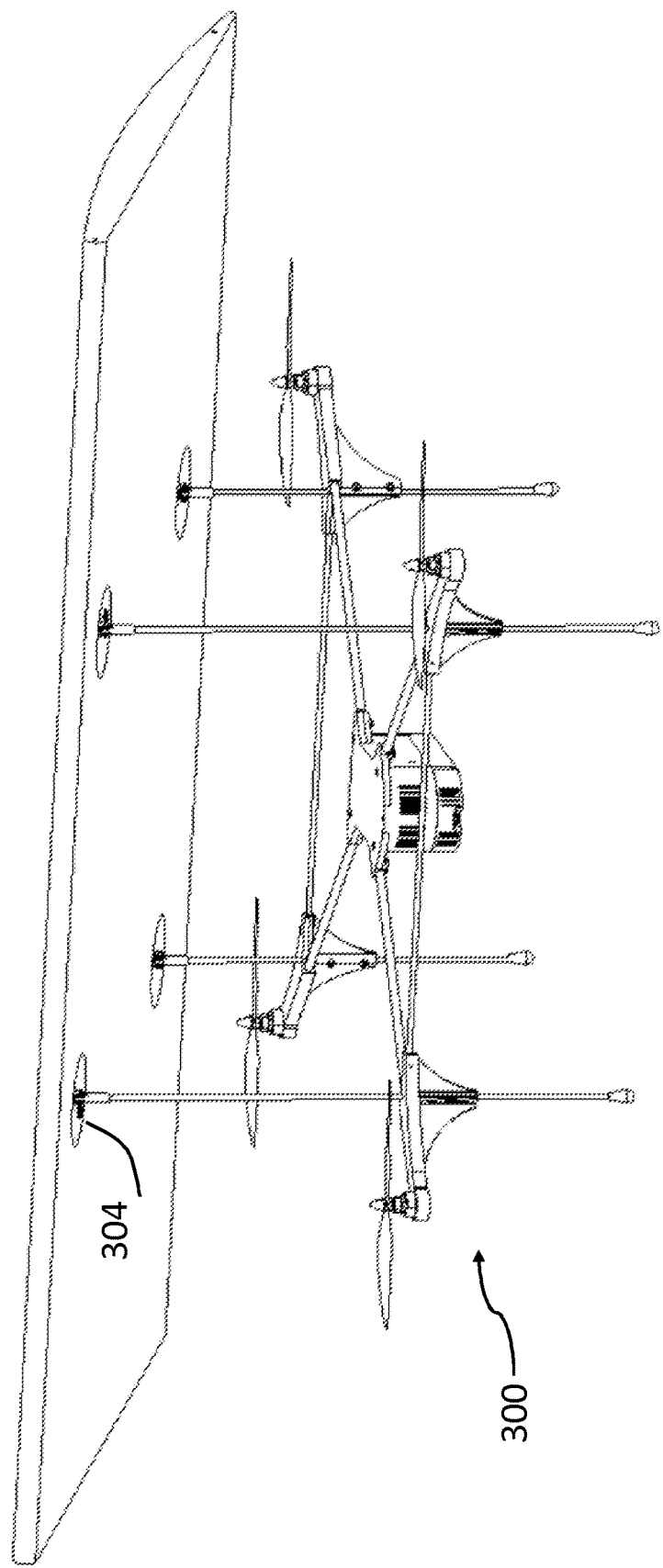
FIG. 15 is a front isometric view of the invention with the foam wing assembly attached.

FIG. 14 is a front view of the multicopter with the foam wing assembly attached 300. FIG. 15 is a front isomeric view of the multicopter with a detachable foam wing assembly attached 300. The foam wing construction may take many forms, typically it may involve a hard resin shell over a foam wing shape for added durability and strength. Strut reinforcements (as shown in FIG. 6) may also form the inner structure of the foam wing. The foam wing is an alternate embodiment that would function the same as the foldable sheet sail wing 100 with adjustability in the wing angle from horizontal 210 in the same manner described previously. The multicopter with a detachable foam wing 300 may also include cutouts 304 for easy access to detach vertical struts. The detachable foam wing assembly would not fold for easy transport and storage.

What is claimed is:

1. A quad-copter assembly of an unmanned aerial vehicle, comprising:
- a plurality of propeller drives each comprising a propeller attached to an electric motor;
- a rigid frame where said plurality of propeller drives is mounted;
- said plurality of propeller drives where each drive further comprises a rotor axis that is oriented vertically; said plurality of propeller drives provide vertical ascent and descent;
- a wing mounted to said rigid frame wherein said wing is angled from horizontal when said vehicle is at rest and where said wing provides lift during forward motion of said unmanned aerial vehicle;
- a plurality of vertically orientated spars securing the wing to the rigid frame;
- where said plurality of vertically orientated spars each traverses through a respective motor mount;
- wherein said plurality of vertically orientated spars include a plurality of front spars and a plurality of rear spars;
- wherein the plurality of front spars and the plurality of rear spars are varied at different lengths such that the wing is positionable at an angle from horizontal;
- where each of said plurality of vertically orientated spars also function as legs of the unmanned aerial vehicle;
- said wing is detachable from said rigid frame; and said quad-copter assembly of an unmanned aerial vehicle ascends, descends, hovers, and moves forward with or without the detachable wing.

2. The quad-copter assembly of the unmanned aerial vehicle of claim 1, wherein the detachable wing further comprises a plurality of rigid spars and a sheet sail.

3. The quad-copter assembly of the unmanned aerial vehicle of claim 2, wherein the sheet sail is comprised of a synthetic fabric material.

4. The quad-copter assembly of the unmanned aerial vehicle of claim 2, wherein said plurality of rigid spars each applies quick-release pins as a means of disassembly to form a more compact shape for storage and transportation.

5. The quad-copter assembly of the unmanned aerial vehicle of claim 1, wherein the said detachable wing comprises a rigid foam.

* * * * *